(12) United States Patent
Yamaoka et al.

(10) Patent No.: US 6,882,506 B2
(45) Date of Patent: Apr. 19, 2005

(54) HEAD SUSPENSION HAVING REDUCED HEAT DEFORMATION

(75) Inventors: Nobuyoshi Yamaoka, Kawasaki (JP); Kenichiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 13 days.

(21) Appl. No.: 10/197,095

(22) Filed: Jul. 17, 2002

(65) Prior Publication Data

US 2003/0147178 A1 Aug. 7, 2003

(30) Foreign Application Priority Data

Feb. 1, 2002 (JP) ........................................ 2002-025740

(51) Int. Cl.$^7$ ................................................ G11B 5/40
(52) U.S. Cl. ................................................ 360/245.9
(58) Field of Search ......................... 360/245.9, 245.4, 360/245.6, 245.7, 245.3, 246

(56) References Cited

U.S. PATENT DOCUMENTS 5,796,552 A * 8/1998 Akin et al. ............... 360/264.2
6,072,664 A * 6/2000 Aoyagi et al. ............ 360/244.5
6,381,100 B1 * 4/2002 Bennin et al. ............ 360/245.9
6,385,014 B1 * 5/2002 Nuno et al. ................ 360/246
6,404,595 B1 * 6/2002 Iwamoto ................... 360/245.9
6,480,359 B1 * 11/2002 Dunn et al. ............... 360/245.9
6,614,624 B1 * 9/2003 Shiraishi et al. ......... 360/245.9

FOREIGN PATENT DOCUMENTS

| JP | 8-102162 | 4/1996 |
| JP | 11-213365 | 8/1999 |

* cited by examiner

Primary Examiner—Angel Castro
(74) Attorney, Agent, or Firm—Greer, Burns & Crain, Ltd.

(57) ABSTRACT

A suspension is made of a suspension body of a stainless plate, a resin protective layer on one surface of the suspension body, a circuit pattern including read wiring and write wiring on the protective layer, and a metal layer provided on the other surface of the suspension body. In this arrangement, heat deformation of the suspension is alleviated when a write current is applied.

2 Claims, 7 Drawing Sheets

HEAD SUSPENSION HAVING REDUCED HEAT DEFORMATION

BACKGROUND OF THE INVENTION

1. Field of the Invention

The present invention relates to a suspension structure for a disk device.

2. Description of the Related Art

A hard disk device such as a magnetic disk device or the like is provided with a plurality of disks for storing information, and heads, such as MR heads or the like, for writing information to the disks and reading information from the disks. Each head is provided on a slider, and each slider is floatably disposed with respect to the disk by means of a suspension structure. Each suspension is coupled to an actuator.

A head is connected to a control circuit by lead wires which extend along the suspension. Recently, a circuit pattern has been formed on the suspension, instead of lead wires, and the circuit pattern is connected via a flexible print board to the print board of the control circuit. In this way, by forming the circuit pattern on the suspension, the disk device can be miniaturized and a high performance can be realized. Also, the circuit pattern has less influence on the suspension of the slider than leads, so that the floating characteristics of the slider are stabilized. Further, the circuit pattern can be easily connected to the head and the flexible print board, and enables easy automatic mounting of the miniaturized heads.

FIGS. 15 and 16 show a prior art suspension system. The suspension 1 comprises an attachment portion 2 for attachment onto an actuator and a tongue 3 for attaching the slider. A circuit pattern including read wiring 4R and 5R and write wiring 6W and 7W is formed on the suspension 1. The read wiring 4R and 5R is formed along one side of the suspension 1 so as to supply a read current R to a not shown head, and the write wiring 6W and 7W is formed along the other side of the suspension 1 so as to supply a write current W to the head. As shown in FIG. 16, the suspension body 1B of the suspension 1 is formed from stainless steel, and is covered by a polyimide (PI) protective coating 8. The read wiring 4R and 5R and the write wiring 6W and 7W of the copper circuit pattern are formed on the protective coating 8, and a PI protective coating 9 covers the read wiring 4R and 5R and the write wiring 6W and 7W.

In the suspension 1 having a laminated structure as shown in FIGS. 15 and 16, the coefficient of thermal expansion of stainless steel is 20 ppm, while the coefficient of thermal expansion of copper is 17.2 ppm, the difference in coefficient of thermal expansion between these metals being relatively small. However, if a localized thermal load is placed on the suspension body 1B when the disk device is operating, deformation occurs in the suspension 1 having the MR head. In particular, deformation occurs in the suspension 1 when the disk device is performing servo track writing. Deformation of the suspension 1 increases in the outer rigger region A on the side where the write current W runs, and the outer rigger region A of the suspension 1 largely deforms so that it expands, as indicated by the arrow B. If the suspension 1 deforms in this manner during servo track writing, the suspension 1 exhibits behavior such as an pivotal oscillating movement, so that, for example, after a first write cycle the position of the MR head may skip one track. This phenomenon decreases if, after application of the write current, there is a wait time of several seconds until the entire head (suspension and coil) becomes warm before writing begins, but this several seconds wait time is a hindrance in a disk device mass production line.

SUMMARY OF THE INVENTION

The object of the present invention is to provide a suspension structure which can alleviate heat deformation of the suspension when a write current is applied.

The suspension structure, according to the present invention, comprises a suspension body, a circuit pattern formed on one surface of the suspension body, and a metal layer provided on the other surface of the suspension body.

In this structure, the metal layer has a heat sink function and suppresses heat deformation when deformation might occur in a portion of the suspension body during application of a write current.

Further, the suspension structure, according to the present invention, comprises a suspension body and a circuit pattern formed on one surface of the suspension body, wherein the circuit pattern has write wiring and read wiring, each of the write wiring and the read wiring being arranged substantially symmetrical with respect to a center line of the suspension body.

In this structure, because the write wiring of the circuit pattern, for example, is arranged substantially symmetrical with respect to the center line of the suspension body, heat deformation of part of the suspension body, especially when a write current flows through the write wiring, is eliminated.

BRIEF DESCRIPTION OF THE DRAWINGS

The present invention will be more clearly understood from the following description of the preferred embodiments, with reference to the accompanying drawings, wherein.

DESCRIPTION OF THE PREFERRED EMBODIMENTS

Preferred embodiments of the present invention will be explained below with reference to the drawings.

Figure 1:
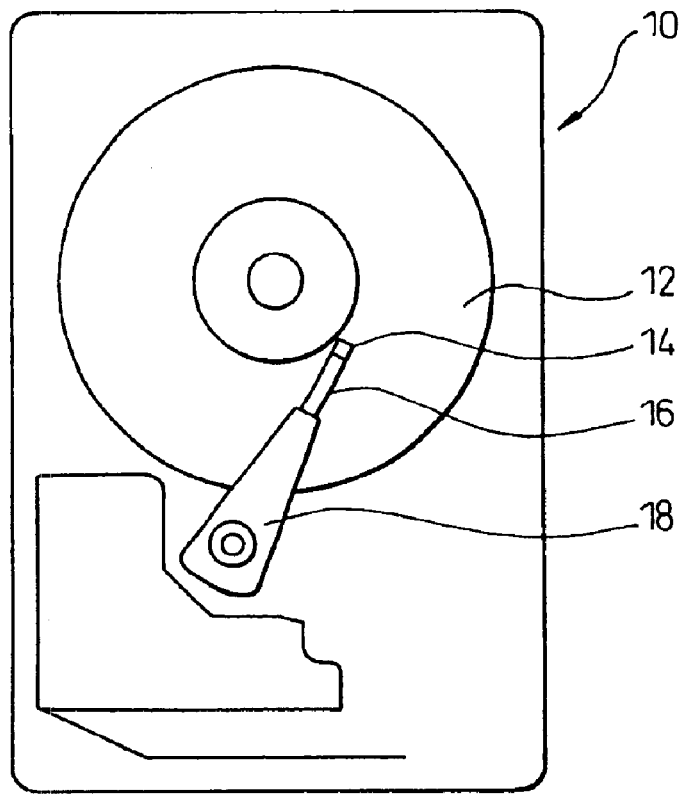
FIG. 1 is a top view of a magnetic disk device.
Figure 2:
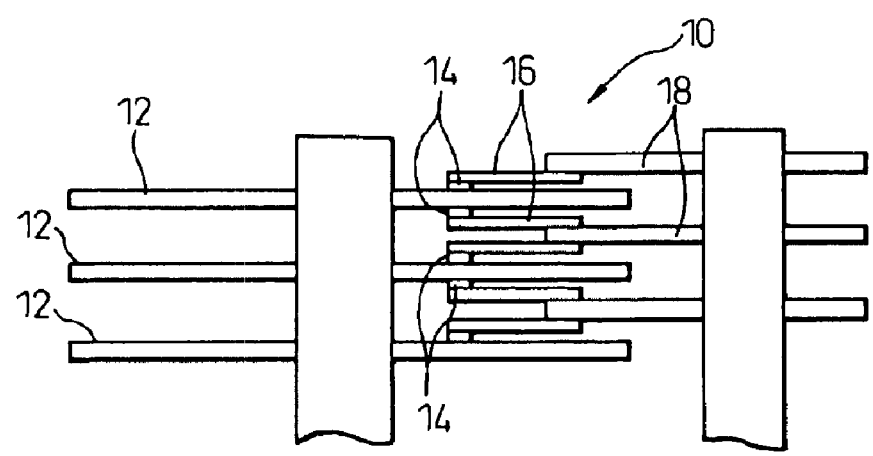
FIG. 2 is a side view of the magnetic disk device.

FIG. 1 is a top view of a magnetic disk device (HDD), and FIG. 2 is a side view of the magnetic disk device. The disk device 10 comprises a plurality of rotatable disks 12 for storing information, and heads such as MR heads or the like for writing information to the disks 12 and reading information from the disks 12. The heads are provided on sliders 14, and the sliders 14 are floatingly arranged with respect to the disks 12 by suspensions 16. The suspensions 16 are connected to actuators 18. The disks 12 and the actuators 18 are driven by well known motors (not shown).

Figure 3:
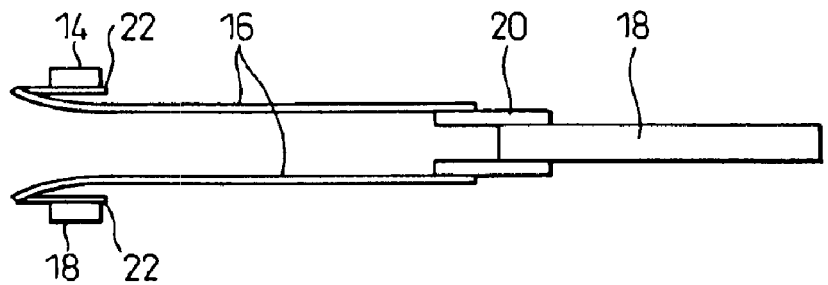
FIG. 3 shows an example of two suspensions attached to one actuator.

FIG. 3 shows an example in which two suspensions 16 are attached to one actuator 18. The suspension 16 is attached to the actuator 18 via a spacer 20. The slider 14 is mounted on a tongue 22 of the suspension 16. An MR head for reading and writing is built in the slider 14 by a well known method.

Figure 4:
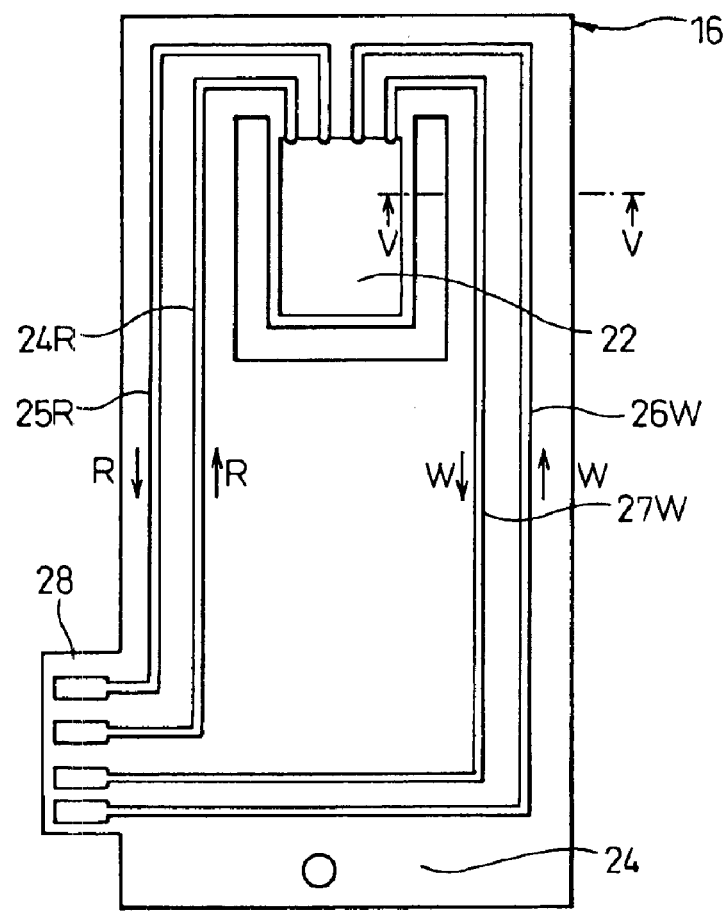
FIG. 4 is a top view of an embodiment of the suspension according to the present invention.
Figure 5:
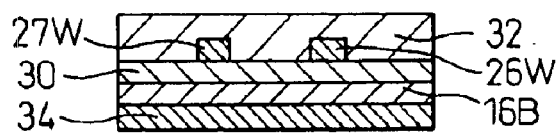
FIG. 5 is a sectional view of a portion of the suspension along the line V—V of FIG. 4.

FIG. 4 is a top view of the first embodiment of the suspension of the present invention. FIG. 5 is a sectional view of a portion of the suspension along the line V—V of FIG. 4. In FIGS. 4 and 5, the suspension 16 has an attachment portion 24 for attachment to the spacer 20 which is attached to the actuator 18, and a tongue 22 for attaching the slider 14. A circuit pattern including a read wiring 24R and 25R and a write wiring 26W and 27W is formed on one surface of the suspension 16. The read wiring 24R and 25R is formed along one side of the suspension 16 in order to supply a read current R to the MR head formed in the slider 14 (not shown), and the write wiring 26W and 27W is formed along the other side of the suspension 16 to supply a write current W. Also, the suspension 16 has a connection region 28 at which the suspension is connected to a flexible print board.

As shown in FIG. 5, the suspension 16 is of a laminated structure comprising a suspension body 16B formed from stainless steel, a polyimide (PI) protective coating 30 applied to one surface of the suspension body 16B, the copper circuit pattern including the read wiring 24R and 25R and the write wiring 26W and 27W formed on the protective coating 30, and a PI protective coating 32 covering the read wiring 24R and 25R and the write wiring 26W and 27W.

Further, the suspension 16 has a metal layer 34 bonded to the other surface of the suspension body 16B. The metal layer 34 is made from copper, for example, and is formed solid, entirely covering the other surface of the suspension body 16B (except for the tongue 22 and the U-shaped slit portion around the tongue 22).

The thickness of the suspension body 16B is 20 $\mu$m, and the thickness of the metal layer 34 is preferably up to 10 $\mu$m so as not to hinder the elastic deformation of the suspension. The thickness of the metal layer 34 should preferably be 3 to 4 $\mu$m.

Figure 15:
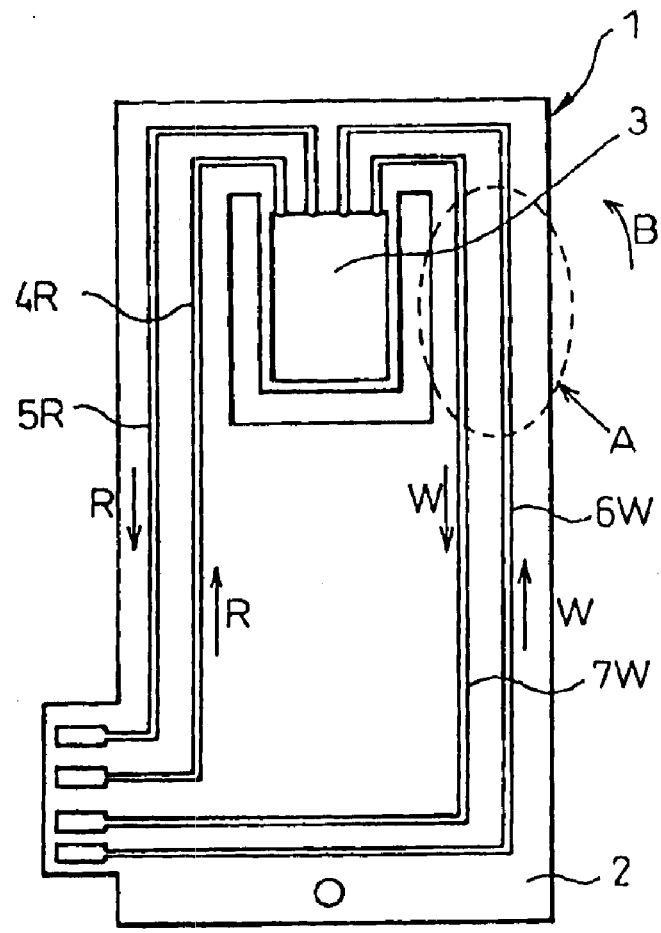
FIG. 15 is a top view of a prior art suspension.
Figure 16:
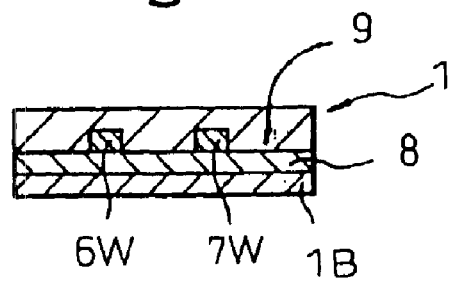
FIG. 16 is a sectional view of a portion of the circuit patterns of the suspension shown in FIG. 14.

In this structure, the metal layer 34 has a function of a heatsink, and alleviates a localized temperature rise at a portion of the suspension body 16B (the outer rigger region A of FIG. 15) when a write current is applied, to suppress heat deformation of the suspension 16. In the prior art shown in FIG. 15, the suspension deforms because heat is applied ununiformly on the side of the outer rigger of the suspension body, when a write current flows, but in the present invention, localized heat deformation of the suspension body 16B is prevented, by cooling the suspension body 16B. If the circuit pattern is provided with an increased distance between itself and the suspension body 16B, radiation noise and suspension characteristics are deteriorated, and therefore, the circuit pattern is located close to the suspension body 16B and the solid metal layer 34 serving as a heatsink is applied to the opposite side of the suspension body 16B to the circuit pattern. When the disk device is in operation a wind of 10 to 30 m/s blows around the slider 14, and if the metal layer 34 is formed of a material having high thermal conductivity, this would have a great heat dissipation effect on the suspension. The coefficient of thermal conductivity of stainless steel is 20W/mK and the coefficient of thermal conductivity of copper is 400W/mK. Also, the metal layer 34 reduces noise generation to the maximum extent possible and keeps the write wiring and the read wiring as symmetrical as possible.

Figure 6:
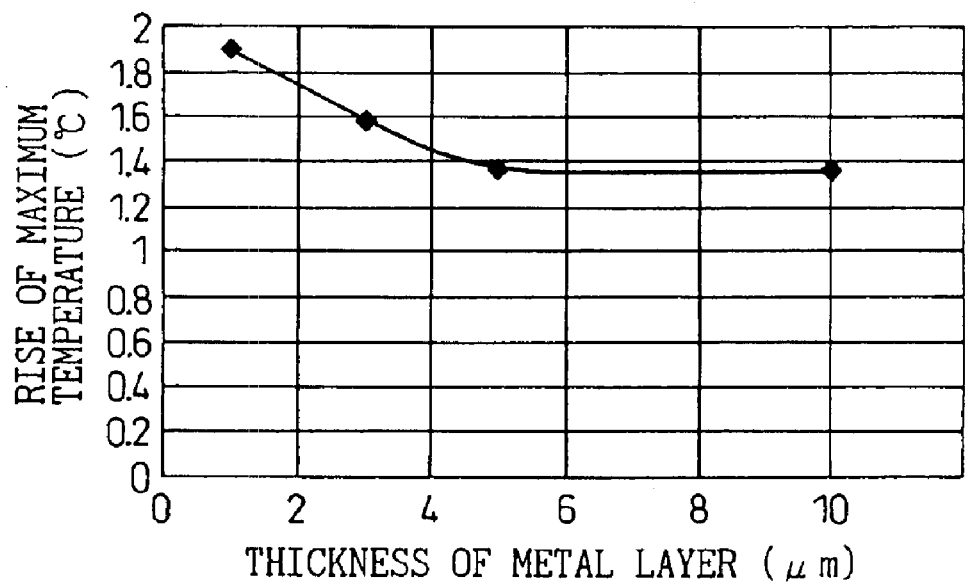
FIG. 6 is a diagram showing the relationship between the thickness of the metal layer and the rise of the maximum temperature increase of the suspension.
Figure 7:
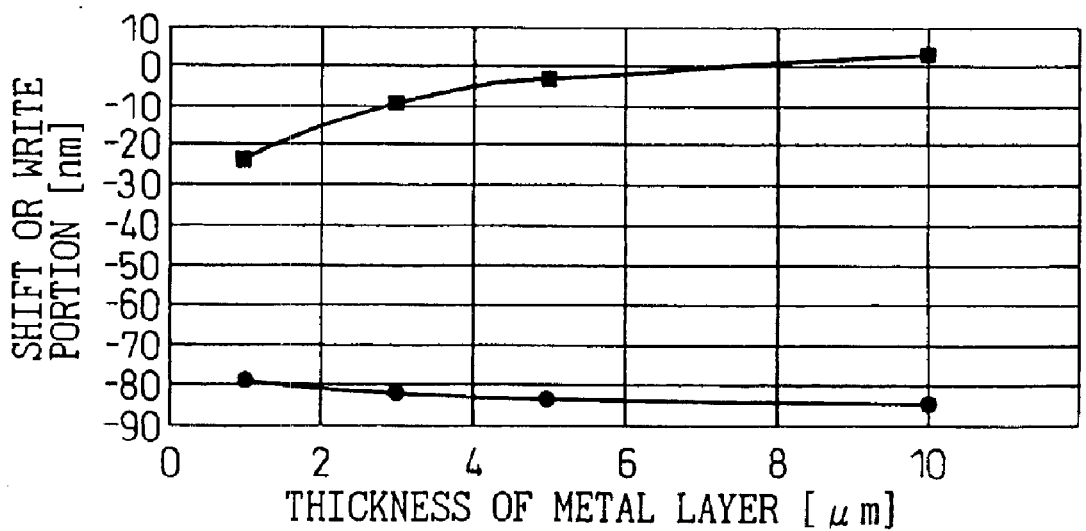
FIG. 7 is a diagram showing the thickness of the metal layer and the shift of the suspension in the write wiring portion.

FIG. 6 is a diagram showing the relationship between the thickness of the metal layer 34 and the rise of the maximum temperature of the suspension 16, arrived at by means of a simulation. FIG. 7 is a diagram showing the thickness of the metal layer 34 and the shift of the suspension 16 at the write wiring portion, also arrived at by means of a simulation. In FIG. 7, the circular dots represent lengthwise shift of the suspension 16, while the square dots represent widthwise shift of the suspension 16. The summary of the simulation is as follows. The copper metal layer 34 is 50 $\mu$m in width and 3.6 $\mu$m in height and has a resistance of 3$\Omega$. The write current is 50 mA.

Figure 8:
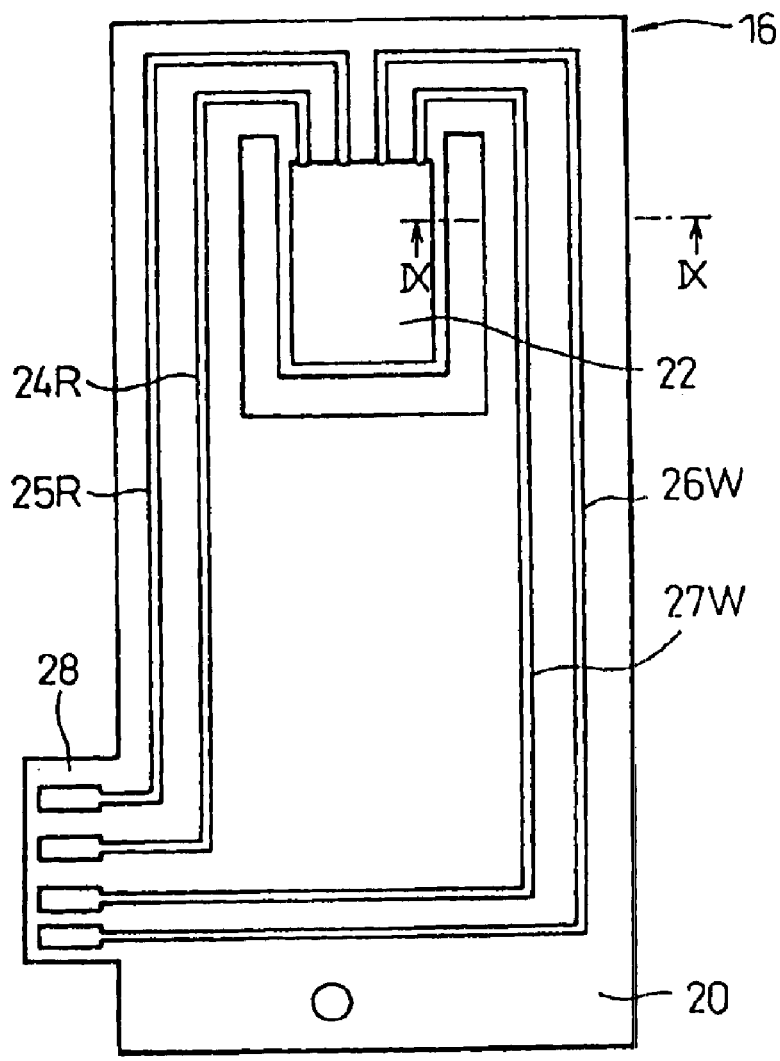
FIG. 8 is a top view of a second embodiment of the suspension according to the present invention.
Figure 9:
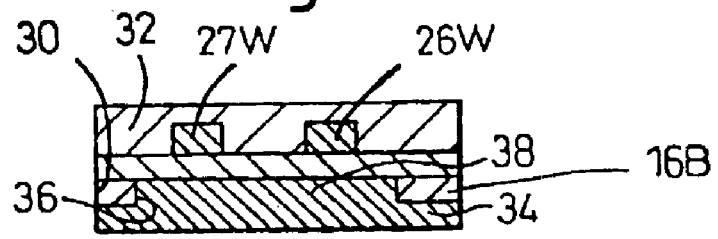
FIG. 9 is a sectional view of a portion of the suspension along the line IX—IX of FIG. 8.
Figure 10:
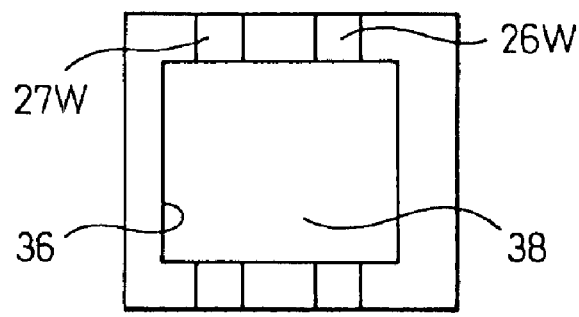
FIG. 10 is a bottom view of a portion of the suspension of FIGS. 8 and 9, without the metal layer.

FIG. 8 is a top view of the second embodiment of the suspension according to the present invention. FIG. 9 is a sectional view of a portion of the suspension along the line IX—IX of FIG. 8. FIG. 10 is a bottom view of a portion of the suspension of FIGS. 8 and 9, without the metal layer. In FIGS. 8 and 9, the suspension 16 has an attachment portion 24 for attachment to a spacer 20, a tongue 22, and a connection region 28 at which the suspension is connected to a flexible print board. Circuit pattern including a read wiring 24R and 25R and a write wiring 26W and 27W is formed on one surface of the suspension 16.

The suspension 16 is a laminated structure comprising a suspension body 16B formed from stainless steel, a PI protective coating 30 applied to one surface of the suspension body 16B, a copper circuit pattern including read wiring 24R and 25R and write wiring 26W and 27W formed on the protective coating 30, and a PI protective coating 32 covering the read wiring 24R and 25R and the write wiring 26W and 27W. The suspension 16 also has a metal layer 34 of solid copper applied entirely to the other side of the suspension body 16B.

Further, in this embodiment, the suspension body 16B has an opening 36 formed therein at a location including the write wiring 26W and 27W (corresponding to the outer rigger region A in FIG. 15), and a second metal layer 38 of copper is inserted in this opening 36. The first metal layer 34 and the second metal layer 38 are in contact with each other, and the second metal layer 38 is closer to the write wiring 26W and 27W and transmits heat generated in the write wiring 26W and 27W to the first metal layer 34, thereby dissipating more heat.

Figure 11:
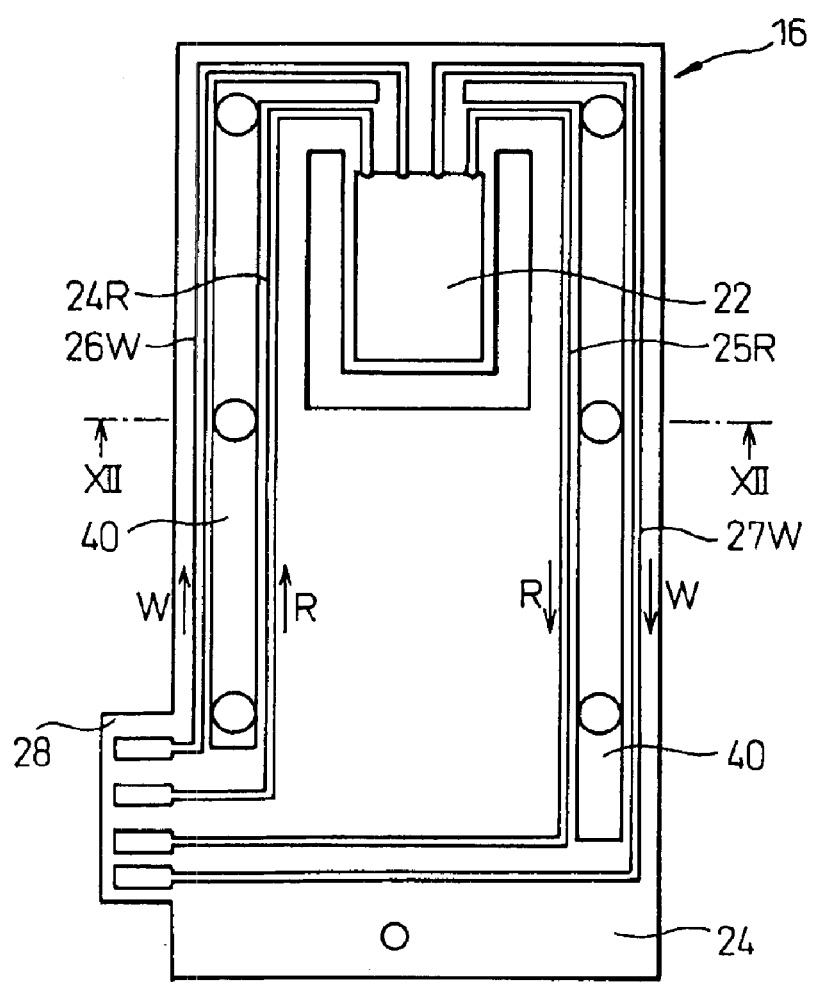
FIG. 11 is a top view of a third embodiment of the suspension according to the present invention.
Figure 12:
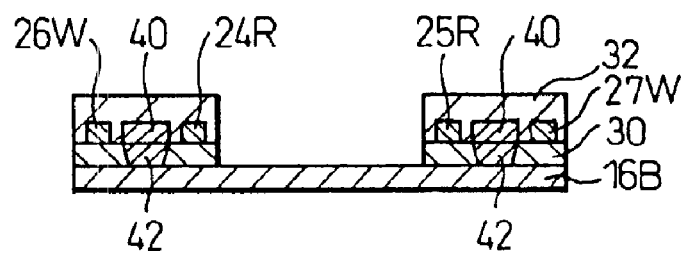
FIG. 12 is a sectional view of a portion of the suspension along the line XI—XI of FIG. 11.

FIG. 11 is a top view of the third embodiment of the suspension according to the present invention. FIG. 12 is a sectional view of a portion of the suspension along the line XI—XI of FIG. 11. In FIGS. 11 and 12, the suspension 16 has an attachment portion 24 for attachment to a spacer 20, a tongue 22, and a connection region 28 at which the suspension is connected to a flexible printed board. A circuit pattern, including read wiring 24R and 25R and write wiring 26W and 27W, is formed on one surface of the suspension 16. The suspension 16 is of a laminated structure comprising a suspension body 16B formed of stainless steel, a PI protective coating 30 applied to one surface of the suspension body 16B, a copper circuit pattern including read wiring 24R and 25R and write wiring 26W and 27W formed on the protective coating 30, and a PI protective coating 32 covering the read wiring 24R and 25R and the write wiring 26W and 27W.

In this embodiment, each of the read wiring 24R and 25R and the write wiring 26W and 27W of the circuit pattern is arranged substantially symmetrical with respect to the center line of the suspension body. In other words, the read wiring 24R is arranged on one side of the center line of the suspension body 16B, and the read wiring 25R is arranged on the other side of the center line of the suspension body 16B. Also, the write wiring 26W is arranged on one side of the center line of the suspension body 16B, and the write wiring 27W is arranged on the other side of the center line of the suspension body 16B.

By arranging the suspension in this manner, noise generation is reduced to the maximum extent possible and localized heat deformation of the suspension body 16B is suppressed.

Further, ground wiring 40 is provided between the read wiring 24R and 25R and the write wiring 26W and 27W. Further, via holes 42 are provided in the protective coating 30, and the ground wiring 40 is electrically connected to the suspension body 16B through these via holes 42. The ground wiring 40 is provided as an anti-noise measure when the write wiring and the read wiring are located in close proximity to each other.

Figure 13:
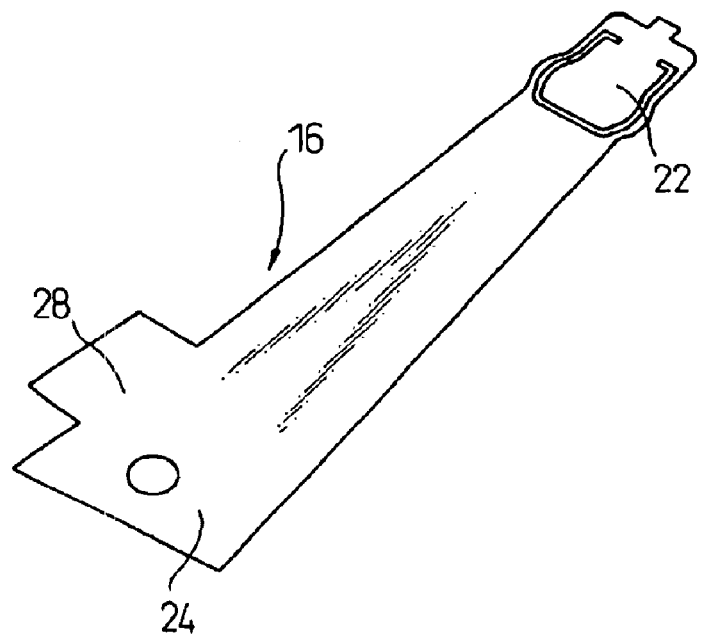
FIG. 13 shows an example of deformation of the suspension.

In the above embodiment, although the suspension 16 is shown to be in a simple rectangular shape for the sake of explanation, it can be formed in other shapes. For example, FIG. 13 shows an example of a suspension 16 in which the forward end is narrower than the rear end. The suspension 16 of FIG. 13 has all of the characteristics explained above.

Figure 14:
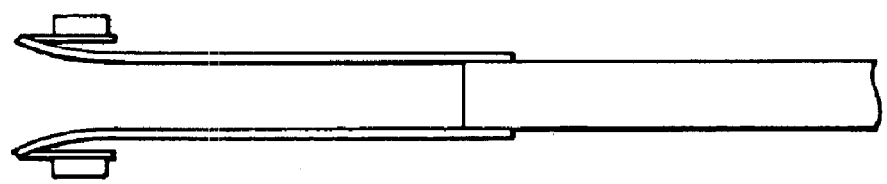
FIG. 14 shows an example of two suspensions attached to one actuator.

Further, in FIG. 3, although the suspension 16 is connected to the actuator 18 via the spacer 20, the suspension 16 can be connected to the actuator 18 by other means. For example, FIG. 14 shows an example where the suspension 16 is attached directly to the actuator.

As explained above, according to the present invention, by providing a metal layer which serves as a heatsink in the suspension, or arranging the write wiring and the read wiring symmetrically, behavior such as a pivotal oscillating movement of the suspension can be suppressed, thus realizing stable servo track writing.

What is claimed is:

1. A suspension structure, comprising:

a suspension body;

a circuit pattern formed on one surface of the suspension body; and a metal layer provided on the other surface of the suspension body, the suspension body having a thickness greater than a thickness of the metal layer, and wherein the suspension body has an opening, and a second metal layer is inserted in said opening and in contact with the metal layer.

2. The suspension structure according to claim 1, wherein said metal layer is applied to substantially all of said other surface of the suspension body.

* * * * *